Figure 1:
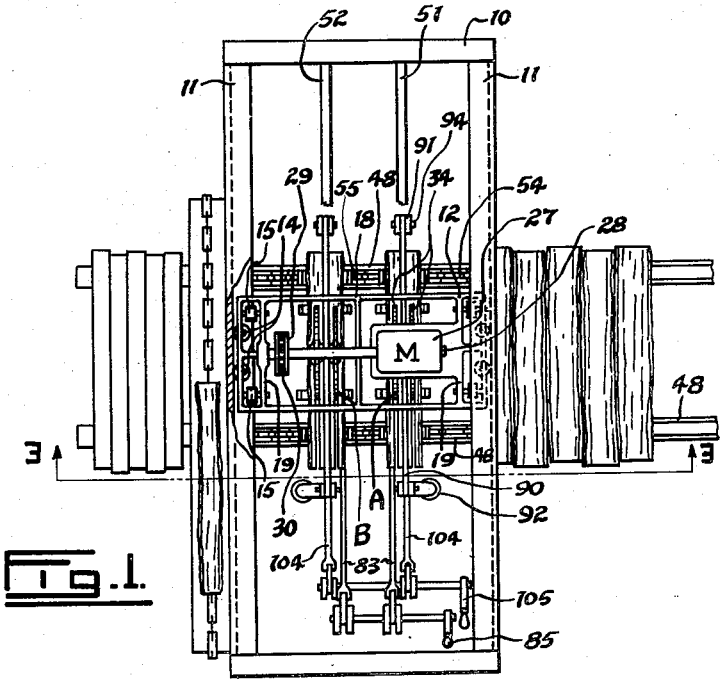

Feb. 16, 1954 W. W. STEVENS 2,669,262
MULTIPLE SAW EQUIPMENT FOR TRAVELING-SAW SAWMILLS
Filed June 27, 1949 3 Sheets-Sheet 1

INVENTOR
WHITNEY W. STEVENS
BY
Fetherstonhaugh & Co.
ATTORNEYS

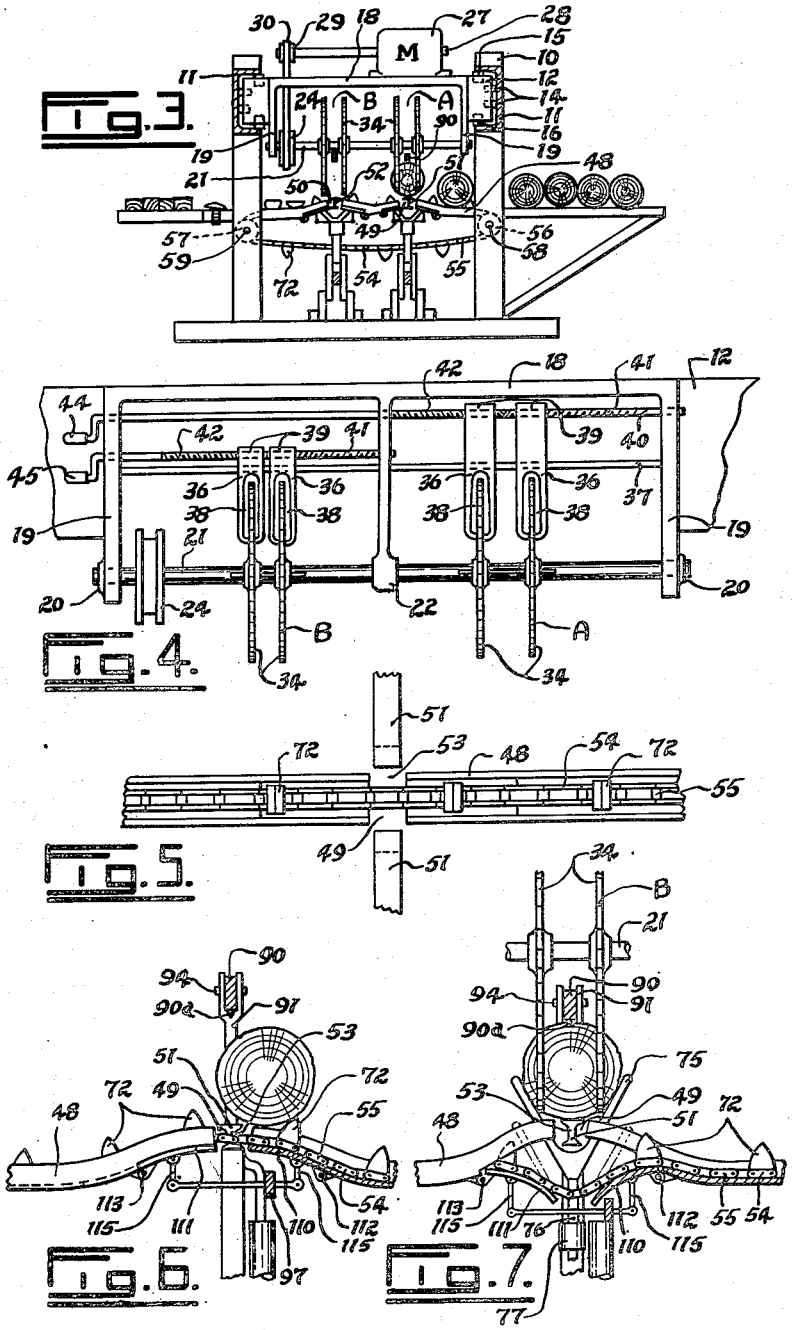

Feb. 16, 1954   W. W. STEVENS   2,669,262
MULTIPLE SAW EQUIPMENT FOR TRAVELING-SAW SAWMILLS
Filed June 27, 1949   3 Sheets-Sheet 3
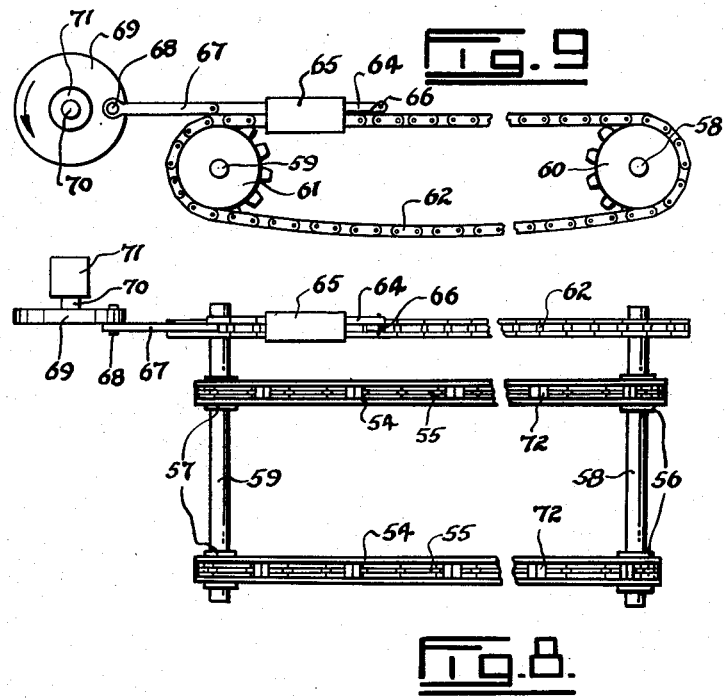
INVENTOR
WHITNEY W. STEVENS
BY
Fetherstonhaugh & Co.
ATTORNEYS Patented Feb. 16, 1954

2,669,262

UNITED STATES PATENT OFFICE 2,669,262

MULTIPLE SAW EQUIPMENT FOR
TRAVELING-SAW SAWMILLS

Whitney W. Stevens, Kamloops, British
Columbia, Canada

Application June 27, 1949, Serial No. 101,544

9 Claims. (Cl. 143—47)

This invention relates to improvements in multiple saw equipment.

The main object is the provision of multiple saw equipment for logs by means of which the outside cuts or slabs may be cut off and the log cut into boards or timbers by the equivalent of one pass of the saws.

Another object is the provision of multiple saw equipment by means of which logs, cants (slabbed on two sides) and dimension timbers may be cut into pieces of exact dimensions either in one or two passes of the saws.

The invention constitutes a radical departure from the present method of manufacturing railroad ties, dimension timbers and boards from round logs. In this invention, the process is to cut one or more stationary sawlogs, cants or dimension timbers by means of multiple saws in a movable carriage, as compared to the present process of moving the log, cant or dimension timber through stationary saws. That part of the invention that relates to the production of ties and dimension timbers from round logs is particularly applicable to portable mills. The major purpose of this invention is to produce lumber products profitably from logs or trees of small size that are marginal or below the margin of profitable manufacture under present methods of sawmilling.

The other objects are (1) to produce dimension timbers or sawn ties by slabbing four sides of the logs in one cutting movement instead of two or four cutting movements; (2) to avoid the heavy vibration so noticeable of head and gang saws, particularly in small mills, caused by side thrust and variable bind between log and saw, affecting the alignment of foundations and causing variable and progressive misalignment, resulting in a variable product and time lost in operation and repairs; (3) to reduce the amount of power required for operation by the elimination of friction loss due to side thrust and bind; (4) to obtain a precision product, so that finishing to size, which frequently requires planing, and a wastage of up to 20% in shavings, may be reduced to a minimum; (5) to manufacture ties, dimension timbers and boards with a highly portable plant that is capable of high production with a small crew, and will produce a precision product with average labour; (6) to obtain a light weight, precision sawmilling plant from standard materials and parts, at a low cost, to cut ties, dimension timber and lumber; (7) to manufacture, profitably, lumber products from the small trees and logs that are now below the margin for profitable manufacture; (8) to utilize small, short-lived trees, such as Lodgepole pine, and other species, that are usually sound when small, but very susceptible to defect as they become older and larger; (9) to reduce costs from log to mill by bringing a highly portable mill to the tree; (10) to reduce costs from mill to market, because suitable stands of trees are located fairly close to large markets; (11) to lower the cost of a product essential to housing and building construction; and (12) in forestry, to make it profitable to thin dense stands of small trees and thus permit increased growth, to shorten the period required to reach economic maturity and thus act to increase supply of timber suitable for milling and increase yield per acre of forest land.

The above objects are attained by saw equipment including a frame which may be stationary or portable, and a saw carriage mounted thereon. This carriage includes one or more sets of multiple saws, the spacing of the saws of each set being adjustable. Conventional means is provided for reciprocating the saw carriage in the frame. Special bearings are provided for the carriage so that the latter will run true, that is, will not deviate from its correct path either in a horizontal or a vertical plane. Where it is mainly desired to produce railroad ties or dimension timber from the round logs, a conveyor is provided for transporting logs across the path of the multiple saws. As it is preferable to have two sets of saws in this case, the logs are transported on the conveyor in spaced relationship to each other. This conveyor is moved intermittently. It is timed to stop when there is one log lying longitudinally in the path of each set of saws. After these logs have been centered and clamped in position, the carriage is moved forwardly to saw the logs into the desired number of pieces.

With this arrangement, each log is cut by each set of saws. When a log lies in the path of the first set of saws, the outside cuts are made on opposite sides thereof to remove two slabs. By the time the log reaches the second set of saws, it has rolled over on to a flat surface. This second set cuts off the remaining two slabs. If a rectangular timber, such as a tie, is required, this removal of the slabs is all that takes place at the second set of saws. However, this set may include enough saws to cut the log longitudinally into a plurality of pieces at the same time as the slabs are cut off. Alternatively, one or more sets of saws may be arranged to cut one or more slabbed logs or cants into a plurality of pieces.

Figure 2:
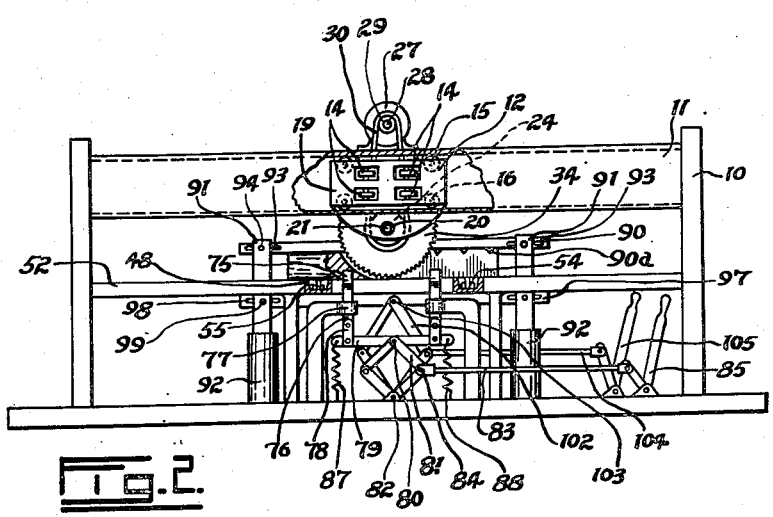

An example of this multiple saw equipment is illustrated in the accompanying drawings, in which, Figure 1 is a plan view of the equipment, Figure 2 is a side elevation thereof, Figure 3 is a cross section taken substantially on the line 3—3 of Figure 1, Figure 4 is an enlarged end view of the saws showing the adjusting mechanism therefor, Figure 5 is an enlarged detail in plan of part of the log conveying apparatus, Figure 6 is an enlarged section through a supporting rail at a transverse supporting rail, showing a log being moved into position to be cut.

Figure 7 is a section similar to Figure 6, showing the log being centered and clamped in the cutting position, Figure 8 is a plan view of the log conveyor and its operating mechanism, and Figure 9 is a side elevation of Figure 8 showing the conveyor operating mechanism.

Referring to the drawings, 10 is a frame having spaced-apart horizontal tracks 11 extending longitudinally thereof. These tracks lie in the same horizontal plane and are preferably in the form of channels lying on their sides and opening inwardly of the frame 10. In other words, the open sides of these tracks face each other. A carriage 12 is mounted in the frame for longitudinal movement thereof and is supported by said tracks. The carriage is provided at each side with one or more rollers 14 lying in a horizontal plane and bearing against the vertical surface of the adjacent rail 11, and with additional rollers 15 and 16 which respectively bear against the top and bottom surfaces of these tracks. The rollers 14 at the opposite sides of the carriage prevent the latter from swaying laterally, while the rollers 15 and 16 prevent said carriage from moving vertically.

The carriage 12 is provided with a platform 18 having supports 19 depending from its opposite sides, said supports carrying bearings 20 for a shaft 21. If desired, a central bearing 22 may be suspended from the platform for supporting the shaft midway between its ends. A pulley 24 may be provided on the shaft at any convenient point thereon. Suitable means is provided for rotating the shaft. This may be an electric or gasoline motor 27 having a shaft 28 with a pulley 29 thereon which is connected to the pulley 24 by a belt 30. If desired, the motor may be off the carriage and the power therefrom transferred to the pulley by a belt.

Suitable means is provided for reciprocating the carriage in the frame. However, as this is standard apparatus in sawmill equipment, it need not be described herein and it has been omitted for the sake of clarity.

A plurality of circular saws 34 are slidably mounted on and rotatable with the shaft 21. These saws are preferably, although not necessarily, arranged in two independent sets A and B, one set on each side of the bearing 22, see Figure 4. These saws may be moved along the shaft in any convenient manner. An arm 36 for each saw 34 is slidably mounted on a shaft 37 which extends between the supports 19 of the carriage. Each arm has a slot 38 formed therein into which the blade of the adjacent saw extends. The arm 36 is formed with an internally-threaded nut 39 at its upper end which rides on a shaft 40 having a left-hand threaded section 41 and a right-hand threaded section 42. Actually, there are two of these shafts, one for the saw set A and the other for the saw set B. The shafts 40 are carried by the supports 19 of the carriage. One of the shafts 40 has a crank 44 on its outer end, while the other shaft has a crank 45 on its outer end located near the crank 44. In this example, there are two saws in each of the sets A and B, and the sawyer is able to control the spacing of the saws in each set by turning the cranks 44 and 45.

If desired, there may be more than two saws in each set, and these could be separated by easily removable spacers.

At a suitable point below the path of the carriage 12 a plurality of spaced beams 48 extend transversely of the frame 10. Each of these beams may be formed with spaced areas 49 and 50 which are higher than the rest of the beams and are located in the path of the saw sets A and B, respectively. Supports 51 and 52 extend transversely of the beams at the elevated areas 49 and 50, respectively. Each of these supports has a gap 53 in line with each of the beams 48. A conveyor 54 extends transversely of the frame 10 adjacent the beams 48. Actually, these beams may be U-shaped in cross section and the conveyor may be made up of a plurality of endless chains 55, each of which rides in the channel of one of the beams and through the gaps 53 of the longitudinal supports. Each of the chains 55 of the conveyor extends around sprockets 56 and 57 located at opposite sides of the frame and mounted on common shafts 58 and 59, one or both of which are rotated by a suitable source of power, see Figure 8. In this example, sprockets 60 and 61 are mounted on the shafts 58 and 59, and an endless chain 62 extends around said sprockets. An arm 64 slidably mounted in a guide 65 extends along this chain and has a dog 66 at one end adapted to engage said chain. A link 67 connects the arm 64 to a pin 68 of a crank wheel 69 mounted on the shaft 70 of a suitable source of power 71, such as an electric or gasoline motor. When the arm 64 moves outwardly with respect to the wheel 69, the dog 66 slides over the chain, but when said arm is moved towards the opposite direction, the dog engages the chain and moves the latter with it. This intermittently moves the conveyor 54.

Each chain is provided with a plurality of pairs of outwardly-projecting lugs 72. Each pair of lugs is spaced from the next adjacent pair of lugs on its chain a distance substantially equal to the distance between the centres of the elevated areas 49 and 50 of the beams 48. The intermittent movement of the conveyor 54 is timed so that when it stops, there is a pair of lugs 72 over each of the elevated areas 49 and 50 of the beams. Logs to be cut are placed on the chains of the conveyor 54 between the pairs of lugs 72 so that said logs extend longitudinally of the frame 10. Each time the conveyor stops, there is a log lying in the path of each of the sets of saws A and B.

Suitable means is provided for centering each log in the path of one of the sets of saws and for holding it in this position while it is being cut. For example, two or more Y-shaped centering devices 75 may be provided for each set of saws along the path thereof, see Figures 2 and 7. Each of the centering devices 75 is located on the top of a suitable support 76 slidably carried in a guide bearing 77. Each support 76 is hingedly connected by a link 78 to a horizontal bar 79 which is common to all the centering devices of each set of saws. The bar 79 is pivotally supported at 80 midway between its ends by a lazy tong arrangement 81 which is pivotally mounted at 82 on the base of the frame 10. A connecting rod 83 is pivotally connected to the arrangement 81 at 84 and extends to an operating lever 85. It is obvious that the centering device may be operated in numerous ways.

When the lever 85 is moved in one direction, the lazy tong arrangement 81 lifts the bar 79 which, in turn, raises the centering devices 75 connected thereto. If one centering device engages a log before the other, it will stop, and the other one will continue to move until it engages the log. The fact that the bar 79 is pivotally mounted midway between its ends permits this. If desired, compensating springs 87 and 88 may be provided normally to maintain the bar 79 substantially in a horizontal position.

Suitable means is provided for clamping each log in position after it has been centered by the devices 75. To this end, a clamping bar 90 having teeth 90a extends longitudinally of the frame above each of the elevated areas 49 and 50, see Figures 2, 6 and 7. Each clamping bar is supported at its opposite ends by standards 91 which are slidably mounted in and project upwardly from guide bearings 92. Each end of the clamping bar has an elongated slot 93 formed therein through which a pin 94 from the upper end of the adjacent standard 91 projects. An operating bar 97 substantially parallel with and spaced below the clamping bar is connected at its opposite ends to the standards 91 in a similar manner, that is, the operating bar is provided with slots 98 in which pins 99 from the standards 91 project. The operating bar 97 and, consequently, the clamping bar 90 may be raised and lowered by a lazy tong arrangement 102 similar to the lazy tong arrangement 81, or in any other suitable way. The arrangement 102 is pivotally connected at 103 to the operating bar substantially midway between its ends, and a connecting rod 104 connects said arrangement to an operating lever 105.

The lever 105 may be moved in either direction to operate the lazy tong arrangement 102 to raise or lower the clamping bar 90. As the logs to be sawn usually taper from one end to the other, one end of the clamping bar 90 will engage the log before the other end. The pivotal mounting of the operating bar on the lazy tong arrangement, and the slots and pins of said bar and of the clamping bar permit the latter to move out of a horizontal plane to bear against the tapered surface of the log.

The elevated areas 49 and 50 may be made high enough and the portions of the beams 48 leading up to and away from them may be made steep enough that there is no danger of the saws 34 touching the beams and the conveyors as the carriage 12 moves back and forth on the frame. However, the bottom sections 110 and 111 of the portions of each beam 48 leading up to and away from a longitudinal support 51 or 52 may be made separate from the rest of the beam and pivotally connected thereto at 112 and 113, respectively, see Figures 6 and 7. The channel of each beam 48 and its sections 110 and 111 register with the gaps 53 in the longitudinal supports 51 and 52.

The ends of the bottom sections 110 and 111 adjacent each of the longitudinal beams may be raised and lowered in any suitable manner, such as by means of connectors 115 which extend downwardly therefrom and are secured to the operating bar 97.

When the operating bar 97 and clamping bar 90 are moved downwardly, the ends of the sections 110 and 111 of each of the beams 48 are drawn downwardly with them. As the chains of the conveyor are resting on the beams, the portions of said chains adjacent the longitudinal beams also drop downwardly. Thus, the conveyor chains and their lugs, and the sections 110 and 111 are moved away from the logs clamped on the longitudinal supports.

In operation, the logs are placed on the conveyor 54 between the pairs of lugs 72 thereof. When the first log moves on to the elevated area 49 of the beams 48, the conveyor stops. Then the centering devices are operated to position the log in line with the saws of the set A. After this, the log is clamped in position. The sawyer then turns the crank 45 to space the saws 34 of the set A the required distance apart. Then the carriage is moved along the frame 10 and these saws cut through the log to cut off the outside slabs. As the area 49 is higher than the adjacent portions of the beams, the slabs fall away from the log. The carriage may now be returned to its first position. When the clamping means is released, the log rolls over on to one of its flat sides. If the carriage is not returned to its first position as stated above, it may be returned when the conveyor is next in motion, or the latter may move only sufficiently far to move the log out of the path of the saws. In the latter case, when the carriage returns to its position, the conveyor again moves to bring the log on to the elevated area 50 of the beams. At the same time, another log has been moved on to the elevated area 49. Now both logs are centered and clamped in position as previously described. This time when the carriage is moved forwardly, the saws of the set A cut the slabs off the log in the path of the latter, while the saws of the set B cut the remaining two slabs off the first log. This results in a timber of rectangular cross section. If desired, there may be more than two saws in the set B, in which case the log would be cut into a plurality of pieces at the same time as the last two slabs are removed.

With the apparatus described, each pair of logs to be cut are properly centered and then firmly held in position. The rollers 14, 15 and 16 retain the carriage in the correct position in its path during the movement thereof without undue friction and, therefore, the saw blades may be set accurately to cut pieces of certain desired dimensions. Similarly, one or more cants or timbers of rectangular cross section, may be fed to one or more sets of multiple saws and simultaneously cut into a plurality of pieces.

What I claim as my invention is:

1. Multiple saw equipment comprising a frame, a carriage reciprocally mounted on the frame, a plurality of circular saws rotatably mounted on the carriage and arranged in two sets, means for rotating the saws, a conveyor for moving logs transversely through the frame, means for intermittently moving the conveyor, the logs on the conveyor being spaced apart a distance equal to that between the saw sets and the conveyor stopping with a log in the path of each of said sets, means for centering the logs in the paths of the saws, and means for clamping the centered log in position in line with each saw set as the carriage is moved along the frame with the saw sets cutting the logs in line therewith.

2. Multiple saw equipment comprising a frame, a carriage reciprocally mounted on the frame, a plurality of circular saws rotatably mounted on the carriage and arranged in two sets, means for rotating the saws, means for adjusting the saws in each set laterally in relation to each other, a conveyor for moving logs transversely through the frame, means for intermittently moving the conveyor, the logs on the conveyor being spaced apart a distance equal to that between the saw sets and the conveyor stopping with a log in the path of each of said sets, means for centering the logs in the paths of the saws, and means for clamping the centered log in position in line with each saw set as the carriage is moved along the frame with the saw sets cutting the logs in line therewith.

3. Multiple saw equipment comprising a frame, a carriage reciprocally mounted on the frame, a plurality of circular saws rotatably mounted on and suspended from the carriage, said saws being arranged in two sets, means for rotating the saws, supporting means extending transversely of the frame beneath the carriage, an elevated area on the supporting means in the path of each saw set, a conveyor for moving logs along the supporting means transversely of the frame, means for intermittently moving the conveyor, the logs on the conveyor being spaced apart a distance equal to that between the elevated areas and the conveyor stopping with a log on each of said areas, and means for clamping each log in position on its elevated area as the carriage is moved along the frame with the saw sets cutting the logs in line therewith.

4. Multiple saw equipment comprising a frame, a carriage reciprocally mounted on the frame, a plurality of circular saws rotatably mounted on and suspended from the carriage, said saws being arranged in two sets, means for rotating the saws, a plurality of spaced U-shaped beams extending transversely of the frame beneath the carriage, an endless conveyor consisting of a plurality of chains extending along the channels of the beams, means projecting outwardly from the conveyor for moving logs extending across the beams along the latter, means for intermittently moving the conveyor, the logs on the conveyor being spaced apart a distance equal to that between the saw sets and the conveyor stopping with a log in the path of each of said sets, and means for clamping each log in position in the path of a saw set as the carriage is moved along the frame with the saw sets cutting the logs in line therewith.

5. Multiple saw equipment comprising a frame, a carriage reciprocally mounted on the frame, a plurality of circular saws rotatably mounted on and suspended from the carriage, said saws being arranged in two sets, means for rotating the saws, a plurality of spaced U-shaped beams extending transversely of the frame beneath the carriage, an elevated area on each beam in the path of each saw set, an endless conveyor consisting of a plurality of chains extending along the channels of the beams, means projecting outwardly from the conveyor for moving logs extending across the beams along the latter, means for intermittently moving the conveyor, the logs on the conveyor being spaced apart a distance equal to that between the elevated areas and the conveyor stopping with a log on each side of said areas, means for centering a log on each elevated area, and means for clamping each centered log in position on its elevated area as the carriage is moved along the frame with the saw sets cutting the logs in line therewith.

6. Multiple saw equipment as claimed in claim 5 in which the center section of each beam leading up to and away from each elevated area is separate from the rest of the beam and pivotally connected thereto, and including means for raising and lowering the ends of the center sections adjacent each elevated area in relation thereto in order to raise and lower the conveyor chains.

7. Multiple saw equipment comprising a frame, a carriage reciprocally mounted on the frame, a plurality of circular saws rotatably mounted on and suspended from the carriage, means for rotating the saws, a supporting beam in line with and below the saws, means for moving logs one at a time onto the beam, said log extending longitudinally of the beam in the path of the saws, a clamping bar above and extending longitudinally of the beam, and means for moving the bar downwardly against a log on the beam firmly to hold said log in position while the carriage is moved along the frame with the saws cutting the log.

8. Multiple saw equipment comprising a frame, a carriage reciprocally mounted on the frame, a plurality of circular saws rotatably mounted on and suspended from the carriage, means for rotating the saws, a supporting beam in line with and below the saws, means for moving logs one at a time onto the beam, said log extending longitudinally of the beam, a clamping bar above and extending longitudinally of the beam and means for moving each end of the bar downwardly against a log on the beam, each end of the bar being movable relative to the other end.

9. Multiple saw equipment comprising a frame, a carriage reciprocally mounted on the frame, a plurality of circular saws rotatably mounted on and suspended from the carriage, said saws being arranged in two sets, means for rotating the saws, a supporting beam in line with and below each set of saws, means for moving logs one at a time onto both beams, each log extending longitudinally of its beam in the path of a set of saws, a clamping bar above and extending longitudinally of each beam, and means for moving the bars downwardly against the logs on the beams firmly to hold said logs in position while the carriage is moved along the frame with the saws simultaneously cutting the logs.

WHITNEY W. STEVENS.

References Cited in the file of this patent

UNITED STATES PATENTS

| Number | Name | Date |
|---|---|---|
| 345,758 | Barnes | July 20, 1886 |
| 482,319 | Rodgers | Sept. 6, 1892 |
| 777,584 | Bartlow | Dec. 13, 1904 |
| 933,932 | Thomas | Sept. 14, 1909 |
| 995,833 | Wood | June 20, 1911 |
| 1,841,032 | Hutchinson | Jan. 12, 1932 |
| 1,905,387 | Kirkwood | Apr. 25, 1933 |
| 2,254,293 | Kaehlert | Sept. 2, 1941 |
| 2,352,885 | Bukowsky | July 4, 1944 |

FOREIGN PATENTS

| Number | Country | Date |
|---|---|---|
| 167,582 | Germany | Feb. 3, 1906 |
| 560,724 | Germany | 1932 |